United States Patent [19]

Anguera

[11] Patent Number: 4,572,314
[45] Date of Patent: Feb. 25, 1986

[54] ELECTRICAL POWER STEERING MECHANISM OF THE RACK AND PINION TYPE FOR MOTOR VEHICLES

[75] Inventor: Narciso M. Anguera, Barcelona, Spain

[73] Assignee: Bendiberica, S.A., Barcelona, Spain

[21] Appl. No.: 602,835

[22] Filed: Apr. 23, 1984

[30] Foreign Application Priority Data

Apr. 28, 1983 [ES] Spain ................... 522.273

[51] Int. Cl.$^4$ .............................................. B62D 5/04
[52] U.S. Cl. .............................. 180/79.1; 74/388 PS; 74/498
[58] Field of Search ................... 180/79.1; 74/388 PS, 74/388 R, 498, 499, 500; 318/2

[56] References Cited

U.S. PATENT DOCUMENTS 2,446,393  8/1948  Russell ........................... 74/388 R
4,415,054  11/1983  Drutchas ........................ 192/0.07

FOREIGN PATENT DOCUMENTS 55-44058  3/1980  Japan ......................... 180/79.1
55-123044  9/1980  Japan ........................... 74/498

Primary Examiner—Andrew M. Dolinar
Attorney, Agent, or Firm—Larry J. Palguta; Ken C. Decker; Ronald D. Welch

[57] ABSTRACT

The electrical power steering mechanism comprises an electric motor (30) whose stator is mounted in the steering box (10) and whose rotor (32) is disposed coaxially around a cylindrical portion of the rack structure (40) provided with helicoidal grooves (41) and forming a screw of a ball circuit mechanism in cooperation with a nut structure (33) having helicoidal grooves (35) and fastened to the rotor (32), the drive pinion (20), typically a Novikof profile globoidal pinion, meshing directly with the ball circulation helicoidal grooves (41) of the rack (40).

8 Claims, 5 Drawing Figures

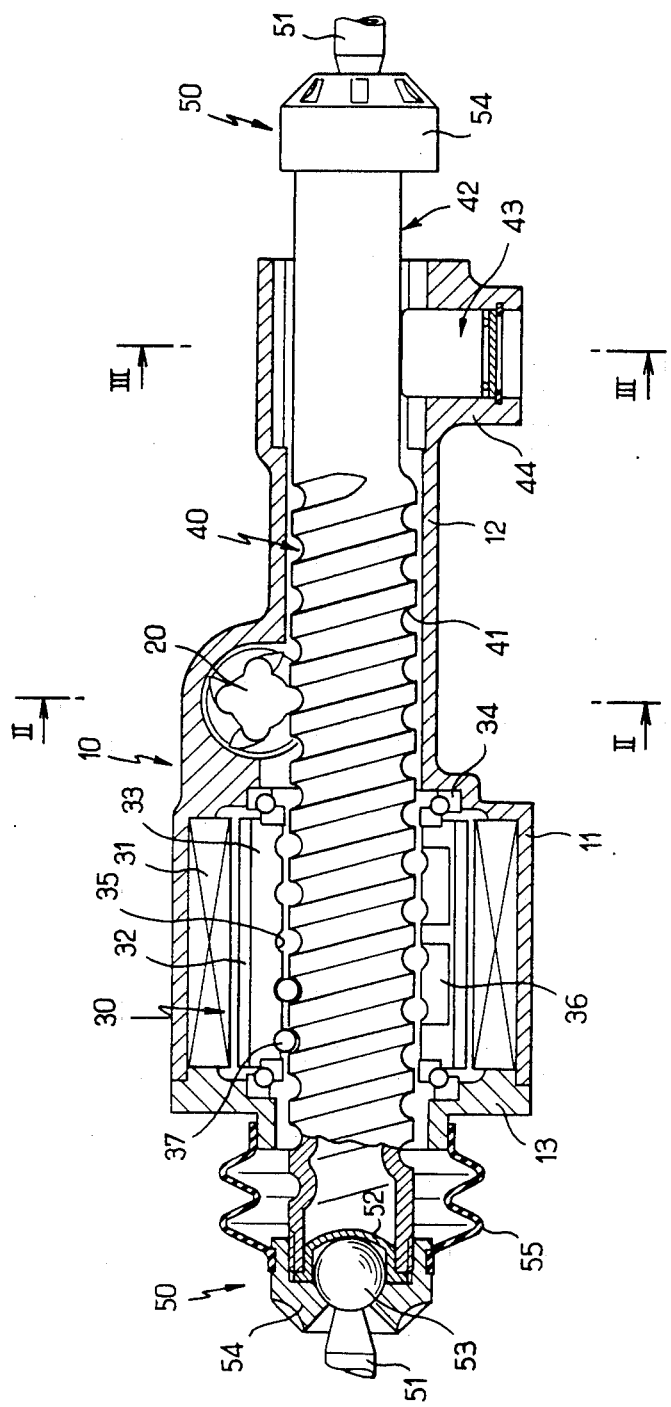
FIG_1

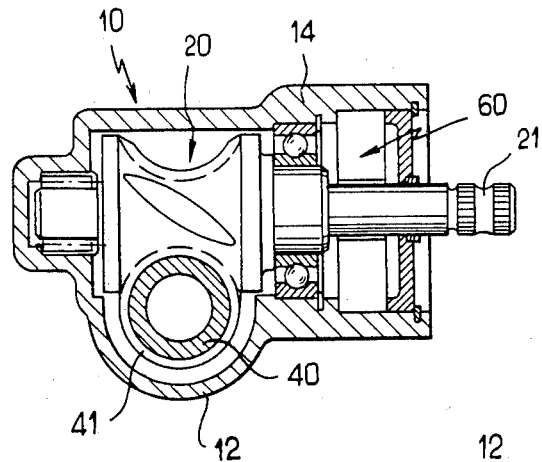
FIG_2
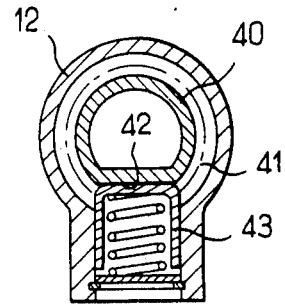
FIG_3
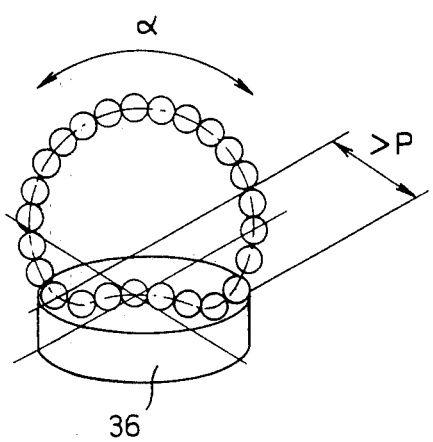
FIG_4
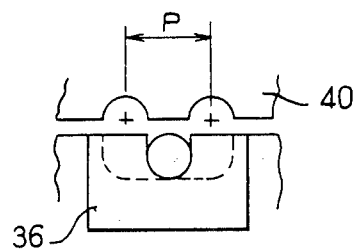
FIG_5

ELECTRICAL POWER STEERING MECHANISM OF THE RACK AND PINION TYPE FOR MOTOR VEHICLES

The present invention relates to electrical power steering mechanisms for motor vehicles, and more particularly to an electrical power steering mechanism of the rack and pinion type, comprising an operating assembly consisting of a rotary input member intended to be connected to a steering wheel and fastened to a pinion which meshes, inside a steering box, with a rack structure intended to be connected to a system controlling the direction of the steered wheels of the vehicle, an electric power assistance motor coupled to the operating assembly, and a transducer means coupled to the input member for selectively controlling the electric motor in dependence on the rotation of the input member.

A mechanism of this type is described, for example, in the French patent document A No. 247,475. In this known mechanism the electric power assistance motor is coupled to a part of the steering column connecting the steering wheel to the rack operating pinion in the steering box. In addition to the problems of mounting the stator of the motor on the vehicle body structure, this mechanism has the disadvantage of inducing a considerable moment of inertia in the steering operating assembly in the non-assistance phases and of requiring a power assistance motor of ample dimensions because of its action on an upstream part of the assembly.

The object of the present invention is to propose an electrical power steering mechanism which is of light and compact construction, requires only a small number of component parts, is inexpensive to manufacture and has low inertia, and which is in the form of a unitary assembly adapted to be easily installed in any type of vehicle without entailing any special structural modifications of the vehicle or of its system controlling the direction of the steered wheels.

For this purpose, according to one characteristic of the invention, the electric motor comprises a stator mounted in the steering box and a rotor disposed coaxially around a cylindrical portion of the rack structure provided with helicoidal grooves and forming a screw or a ball circuit mechanism in cooperation with a nut structure having helicoidal grooves and fastened to the rotor.

With an arrangement of this kind the electric power assistance motor is integrated into the steering box and acts directly on the output member of the latter, with the consequence of optimum efficiency and low consumption of electricity.

According to another characteristic of the invention, the helicoidal ball circulation grooves of the rack structure form the means for the engagement of the latter with the pinion of the input member, typically a Novikof profile globoidal pinion, the rack structure advantageously being made by stamping from a hollow tube.

This arrangement makes it possible to reduce considerably not only the dimensions and weight of the mechanism, and therefore its inertia, but also the cost of mass production and installation.

Other characteristics and advantages of the present invention will emerge from the following description of one embodiment, which is given by way of illustration but without in any way constituting a limitation, and with reference to the accompanying drawings, in which:

FIG. 1 is a diagrammatical view in longitudinal section of a power steering mechanism according to the invention;

FIG. 2 is a cross-sectional a view taken along II—II in FIG. 1;

FIG. 3 is a cross-sectional a view taken along III—III in FIG. 1, and

FIGS. 4 and 5 illustrate diagrammatically the geometrical characteristics of the ball recirculation units integrated into the nut structure fastened to the rotor of the electric power assistance motor.

The electrical power steering mechanism shown in FIGS. 1 to 5 comprises a steering box given the general reference 10 and made for example in the form of a casting, this steering box comprising a main body portion 11 of generally cylindrical shape, which is extended at one end by a tubular portion 12 and closed at the opposite end by an annular cap 13. At the junction between the main body portion 11 and the tubular extension 12, the box 10 forms a transverse tubular housing 14, in which a drive assembly is rotatably mounted, consisting of a pinion 20 and an input shaft member 21 intended to be connected to the steering wheel of a vehicle. In the main body portion 11 is installed an electric motor, which is given the general reference 30 and comprises a cylindrical stator 31 mounted in the body 11 and a coaxial assembly comprising a rotor 32 and a central tubular nut structure 33, this inner rotating assembly being mounted for rotation in the box 10 and the cap 13 by bearings, such as 34. A rack structure, given the general reference 40, extends coaxially in the tubular extension 12 of the box 10 and the rotating assembly 32–33, being extended on both sides of the box 10, the axially opposite ends of the rack structure 40 being each provided with a connection means 50 articulated to connecting rods 51 of a system controlling the direction of the steered wheels of the vehicle.

As can be clearly seen in FIG. 1, the rack structure 40 is made by stamping from a hollow tube so as to form peripheral helicoidal grooves 41 on a major portion of its length extending in the main body portion 11 of the box 10. The opposite end of the rack structure 40 to that where the electric motor 30 is installed extends outwards beyond the tubular extension 12 of the box 10 and, in contrast, has a smooth peripheral wall, which is generally cylindrical but has a longitudinal flat 42 intended to cooperate with a resilient push member 43 mounted transversely in a boss 44 on the end of the tubular extension 12 of the box 10. In this way, as the result of the cooperation between the flat 42 and the resilient push member 43, the rack structure 40 can slide longitudinally in the box 10, without however being able to turn about its own axis, which is likewise the axis of the electric motor 30. The central nut structure 33 fastened to the rotor 32 is provided with helicoidal grooves 35 and with at least one recirculating ball unit 36 (also shown in FIGS. 4 and 5) for driving balls 37, which cooperate both with the inner grooves of the nut 33 and with the outer grooves of the rack structure 40, so as to convert the rotary movement of the rotor 32 into a translatory movement of the rack structure 40. As shown in FIGS. 4 and 5, each recirculating ball unit 36 forms on its inner surfaces a tortuous recirculation channel of a width which, in longitudinal view, is equal to the pitch P of the helicoidal grooves 41 and 35 and has a length greater than the said pitch P, for the recirculation of the balls which have travelled over a helicoidal path, on an evolute of an angle α equal to about 300°.

According to one aspect of the invention, as can be seen in FIG. 2, the drive pinion 20 is a Novikof profile globoidal pinion such as that described for example in Volume 179, No. 30. of Proc. Instn Mech. Engrs 1964–1965, page 931 et seq., meshing directly with the helicoidal ball recirculation grooves 41 of the rack structure 40.

As can be seen in FIG. 2, the transverse tubular housing 14 of the box 10 contains a pickup or transducer means 60 associated with the input shaft member 21 and adapted to be operated, in dependence on the rotation of the input shaft 21 in either direction, for selectively controlling the electric motor 30 in accordance with the direction and amplitude of the rotation of the input shaft 21. Typically, the transducer means 60 is a magnetorestrictive torque measuring transducer such as that described in the Oct. 1969 edition of "Instrumentation Technology", page 95 et seq.

As illustrated in FIG. 1, a seat 52 for a ball 53 at the end of the connecting rod 51 is installed at each end of the tubular rack structure 40, the seat 52 being held in position by a cap 54 screwed onto the externally threaded end of the rack 40. A bellows seal 55 is advantageously provided at least between the cap 13 and the adjacent cap 54.

Although the present invention has been described in connection with one particular embodiment, it is not limited thereby but on the contrary is capable of modifications and variants which will be apparent to those versed in the art.

I claim:

1. An electrical power steering mechanism for a vehicle, comprising an axially reciprocable driven rack structure, a rotary electric motor having an output member operatively connected with peripheral helical grooves formed on a cylindrical portion of said rack structure via a ball drive connection between said output member and said grooves for driving said rack structure, a rotatable pinion gear coupled to a manual input member and in meshing engagement with said grooves for driving said rack structure, and sensing means responsive to actuation of said input member for actuating said electric motor.

2. The mechanism of claim 1, wherein said pinion gear is a Novikof-profile globoidal pinion.

3. The mechanism of claim 2, wherein said electric motor is arranged in a housing, said pinion gear being rotatably mounted in said housing adjacent said ball drive connection, there being provided in said housing resilient means cooperating with said rack structure for preventing rotation of said rack structure.

4. The mechanism of claim 3, wherein said rack structure has a generally cylindrical configuration and is formed from a tube.

5. The mechanism of claim 4, wherein said rack structure is shaped by stamping.

6. The mechanism of claim 3, wherein said sensing means are arranged within said housing adjacent said input member.

7. The mechanism of claim 6, wherein said sensing means are operatively coupled to said input member.

8. The mechanism of claim 3, wherein said resilient means comprises a resiliently radially urged pusher member in contact engagement with a side flat formed at one end portion of said rack structure.

* * * * *